United States Patent [19]
Blanchard

[11] Patent Number: 6,129,324
[45] Date of Patent: Oct. 10, 2000

[54] SNAP-ACTION CATCH, IN PARTICULAR FOR FIXING AN AUTOMOBILE VEHICLE SEAT TO A FLOOR OF THE VEHICLE

[75] Inventor: Jean-Marie Blanchard, Nogent sur Vernisson, France

[73] Assignee: Cesa-Compagnie Europeenne de Sieges pour Automobiles, Perret, France

[21] Appl. No.: 09/184,076

[22] Filed: Nov. 2, 1998

[30] Foreign Application Priority Data

Nov. 27, 1997 [FR] France .................................. 97 14948

[51] Int. Cl.⁷ .................................................. A47B 97/00
[52] U.S. Cl. .................................... 248/503.1; 248/188.8; 248/544; 296/65.03; 403/322.2
[58] Field of Search ............................... 248/503.01, 506, 248/507, 509, 501, 503, 544, 188.8; 297/344.1; 296/65.03; 403/322.2, 325, 12, 13

[56] References Cited

U.S. PATENT DOCUMENTS

| | | | |
|---|---|---|---|
| 4,616,952 | 10/1986 | Schott | 403/316 |
| 4,906,123 | 3/1990 | Weskamp et al. | 403/322 |
| 5,248,134 | 9/1993 | Ferguson et al. | 267/220 |
| 5,390,571 | 2/1995 | Fox, III et al. | 81/177.85 |
| 5,458,431 | 10/1995 | Ferreol-Ragotin | 403/322 |
| 5,496,080 | 3/1996 | Chabanne et al. | 292/252 |
| 5,542,273 | 8/1996 | Bednarz | 70/34 |
| 5,653,486 | 8/1997 | Stillwagon | 292/252 |

FOREIGN PATENT DOCUMENTS 2 735 810  12/1996  France .

*Primary Examiner*—Ramon O. Ramirez
*Assistant Examiner*—Walter Landry
*Attorney, Agent, or Firm*—Sughrue, Mion, Zinn, Macpeak & Seas PLLC

[57] ABSTRACT

The catch comprises a bolt (22) having a locking body (24) and means for clipping the body (24) into a keeper (28) by clamping the keeper (28) between a bearing bush (54) and at least one retractable locking ball (56). The bearing bush (54) is mounted to slide axially around the locking body (24), being moveable, by cooperation with the keeper (28), against a return spring force, from a position releasing the bolt (22), in which the bush (54) covers the locking ball (56), holding it in the retracted position, to a position locking the bolt (22), in which the bush (54) and the locking ball (56) grip the keeper (28). The bolt (22) further includes safety means (80) preventing accidental displacement of the bush (54) from its bolt releasing position to its bolt locking position other than by cooperation of the bush (54) with the keeper (28).

17 Claims, 4 Drawing Sheets

SNAP-ACTION CATCH, IN PARTICULAR FOR FIXING AN AUTOMOBILE VEHICLE SEAT TO A FLOOR OF THE VEHICLE

BACKGROUND OF THE INVENTION

The present invention concerns a snap-action catch, in particular for fixing an automobile vehicle seat to a floor of the vehicle.

One prior art catch comprises a bolt having a generally cylindrical locking body and means for clipping the body into a keeper by clamping the keeper between a bearing bush and at least one retractable locking ball carried by the locking body, the bearing bush being mounted to slide axially around the locking body and being moveable, by cooperation with the keeper, against a return spring force, from a bolt releasing position, in which the bush covers the locking ball, holding it in the retracted position, to a bolt locking position, in which the bush and the locking ball grip the keeper.

A catch of the above type is described in FR-A2 735 174 (FR-95 06 868) or FR-A-2 735 810 (FR-96 07 605), for example.

This type of catch is used to attach a seat removably to the floor of the passenger compartment of a "people mover" type automobile vehicle, for example. In this case the locking body of the bolt is attached to a base of the seat and the keeper is attached to the floor.

If the seat is released, in particular so that it can be removed from the vehicle, the bush of the catch may be accidentally moved against its spring return force, for example by impact against a projecting object or by the inopportune action of a person. The effect of such accidental movement is to release the locking ball in the projecting position. In this case the bush generally cannot of its own accord resume the configuration with the locking ball retracted. Consequently the ball may be damaged and/or may later prevent correct attachment of the seat to the floor of the vehicle.

SUMMARY OF THE INVENTION

The aim of the invention is to prevent accidental movement of the bush against its spring return force when the bolt of the catch is separated from the keeper.

To this end, the invention consists in a catch of the aforementioned type characterised in that the bolt further includes safety means preventing accidental displacement of the bush from its bolt releasing position to its bolt locking position other than by cooperation of the bush with the keeper.

In accordance with other features of the invention:

the safety means comprise at least one safety ball mounted on the locking body so as to be moveable between a position retracted into the body allowing the bearing bush to slide along the body and a position projecting from the periphery of the body immobilising the bearing bush in the position covering the locking ball;

the safety ball is housed in a bore which guides it between its projecting and retracted positions and in a drive slot, the guide bore being formed in the locking body and the drive slot being formed in a mobile drive member carried by the bolt;

the drive member is mounted on the locking body so that it can slide substantially axially on it, the drive slot having an oblique first part cooperating with a ramp effect with the safety ball to move it between its projecting and retracted positions and an axial second part for holding the safety ball in its retracted position;

the drive member is mounted in a substantially axial guide groove formed in the guide body to slide in it and extends radially between the body and the bearing bush;

the drive member is spring-loaded to return the safety ball to the projecting position;

the drive member is a flat strip, the drive slot being formed through the thickness of the drive member, the safety ball having a diameter greater then this thickness so as to enable contact of the safety ball with the bearing bush when the safety ball is in its projecting position;

the bush and the drive member each have a bearing end designed to cooperate with the keeper, the bearing end of the drive member projecting relative to the bearing end of the bush when the bush is in its position covering the locking ball so as to allow, by cooperation of the keeper with these two bearing ends in succession, firstly, displacement of the drive member to move the safety ball from its projecting position to its retracted position and then displacement of the bush to its position locking the bolt in the keeper.

The invention also consists in an application of a catch as defined hereinabove characterised in that the bolt is connected to an automobile vehicle seat and the keeper is attached to a floor of the vehicle.

The invention will be better understood with the aid of the following description given by way of example only and given with reference to the accompanying drawings, in which:

DETAILED DESCRIPTION OF THE INVENTION

The figures show a catch 10 of the invention in a support 12.

The catch 10 is intended to fix a removable automobile vehicle seat to a floor 14 (shown in FIGS. 4 and 5) of the passenger compartment of the vehicle.

Figure 1:
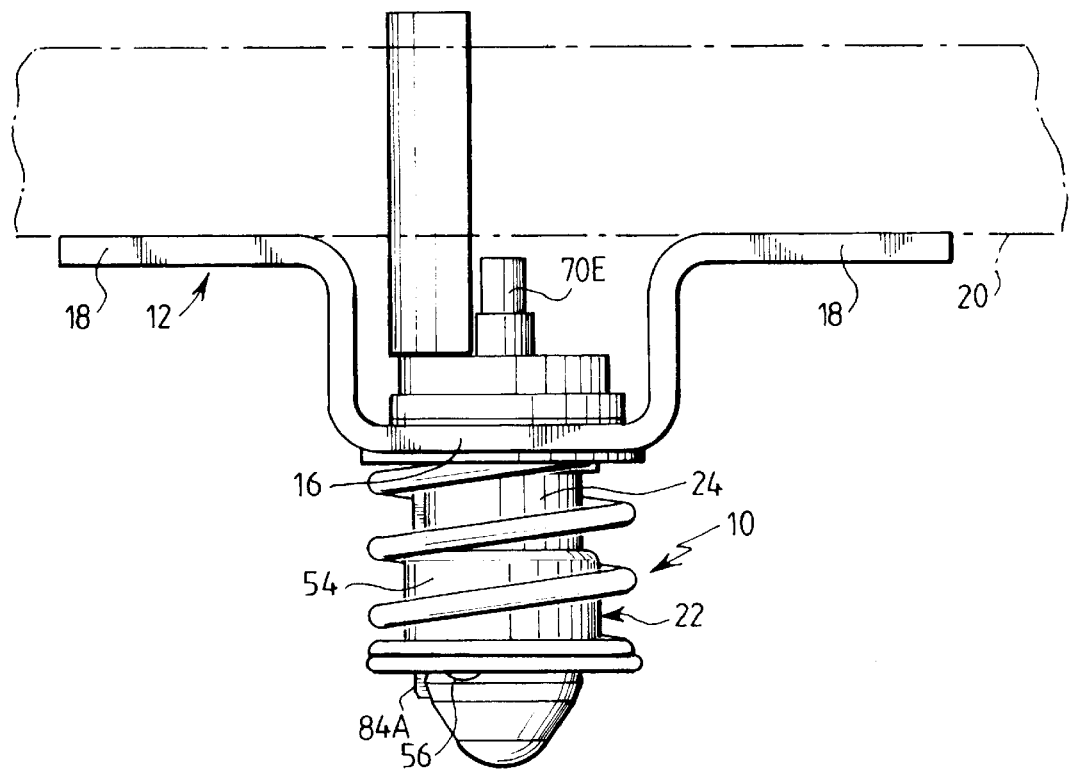
FIG. 1 is a front view of a catch in accordance with the invention.

The generally omega-shape support 12 has a core 16 linking two lugs 18 for attaching the support to a base member 20 of the seat shown diagrammatically in FIG. 1 in chain-dotted outline.

Figure 4:
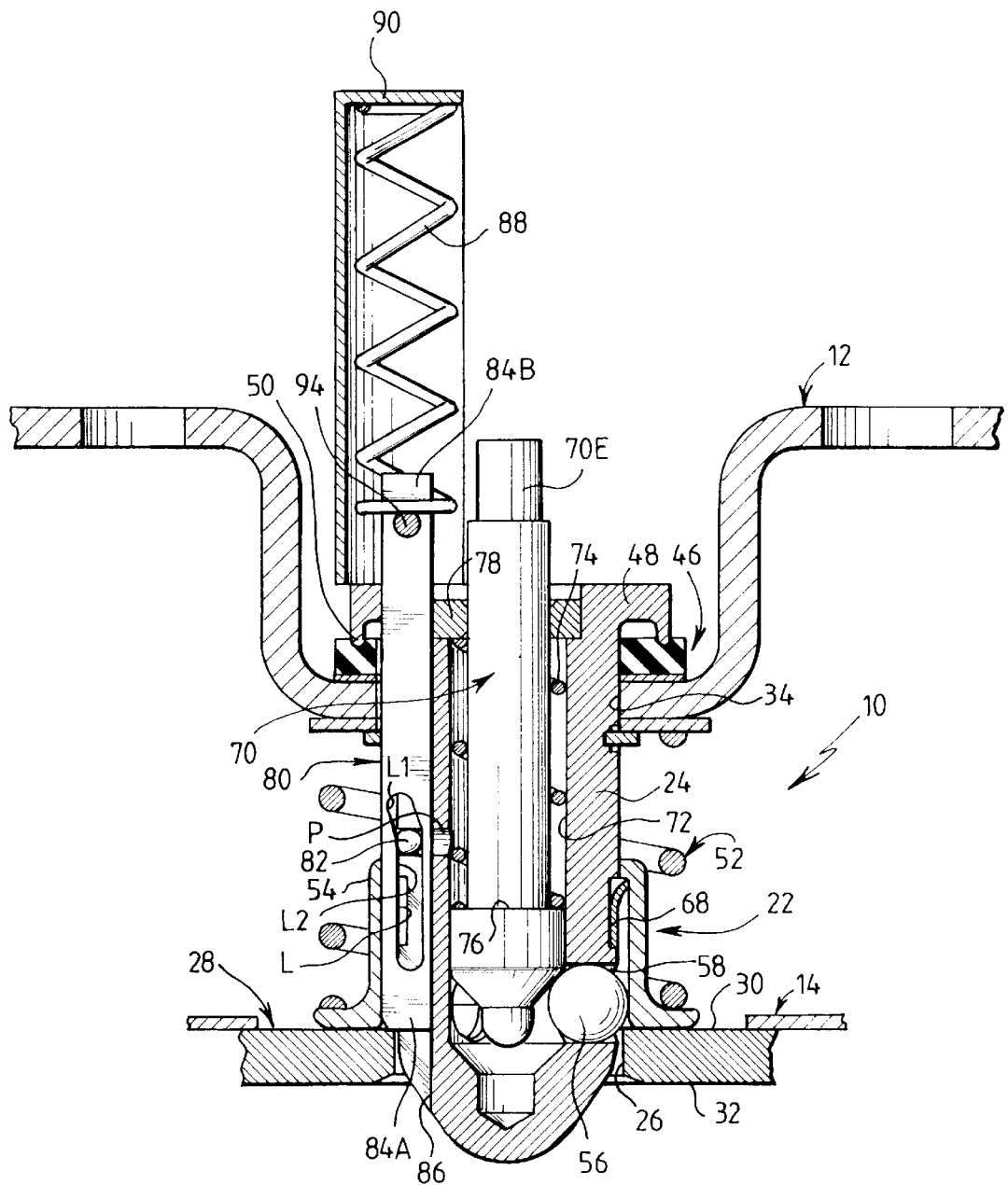
FIGS. 4 and 5 are views similar to FIG. 3 showing successive steps in the attachment of the bolt to the keeper.
Figure 5:
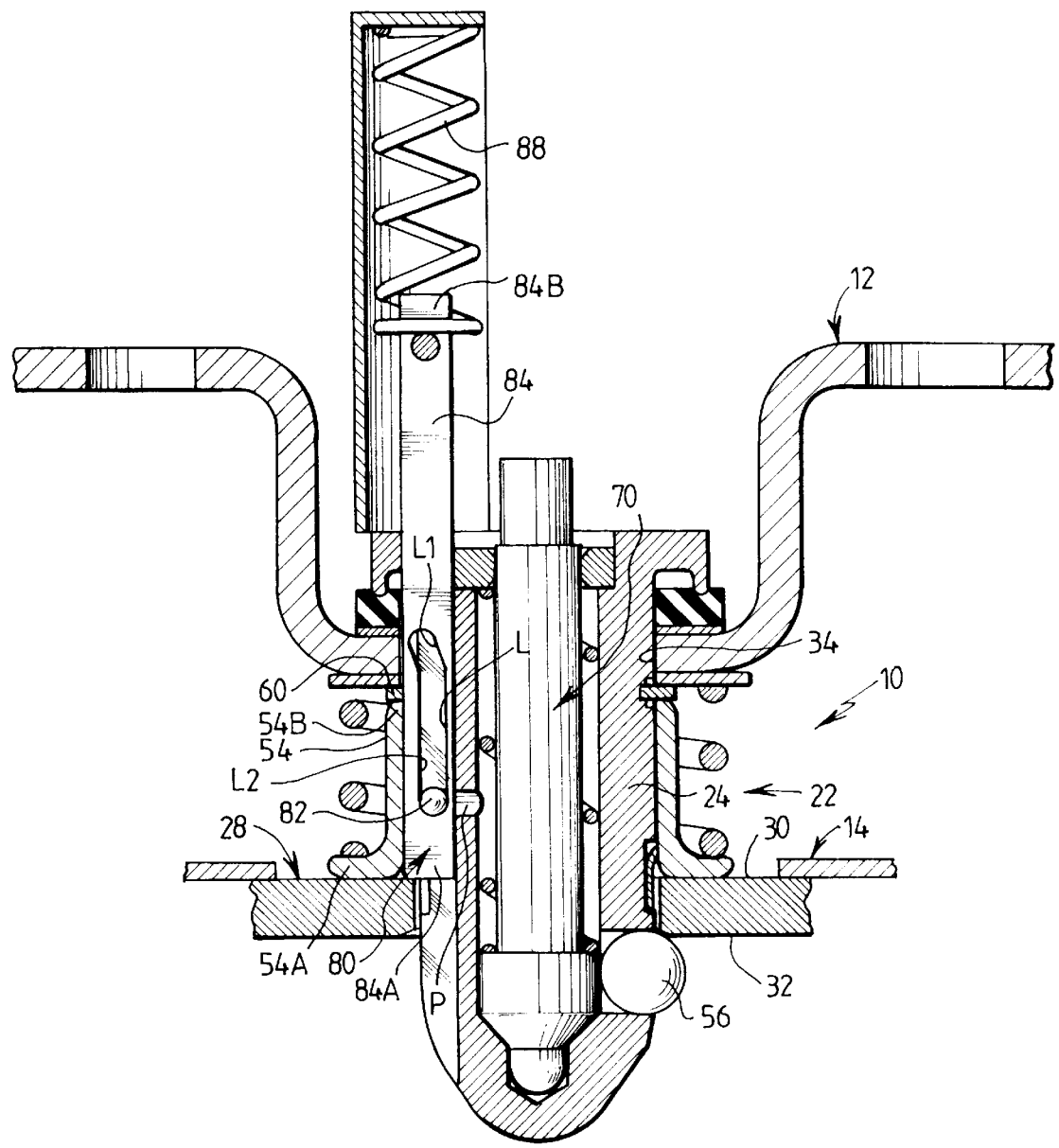

The catch 10 comprises a bolt 22 having a locking body 24 in the form of a cylindrical pin adapted to be locked by means of a snap-action into a locking orifice 26 formed in a keeper 28 fixed to the floor 14 in a manner known in itself (see FIGS. 4 and 5).

The locking orifice 26 extends between two opposite faces 30, 32 of the keeper which is in the form of a plate.

The locking body 24 extends through a hole 34 in the support 12. The hole 34 is in the core 16 between two opposite faces 36, 38 of the core.

The bolt 22 includes spring means 40 for clamping opposite faces 36, 38 of the core 16 intended to immobilise the body 24 in the hole 34.

The clamping means 40 preferably comprise first and second clamping plates 42, 44 cooperating with respective opposite faces 36, 38 of the core 16 and through which the locking body 24 passes and first and second compression spring members respectively urging the first and second clamping plates 42 and 44 towards each other.

The first compression member is a plate 46 made of an elastic material, for example an elastomer, deformable in the direction of its thickness, through which the locking body 24 passes and disposed between the first clamping plate 42 and a bearing head 48 of the body 24 forming one end thereof.

The clamping plates 42, 44 and the elastic plate 46 are preferably in the form of washers.

The bearing head 48 advantageously includes an annular axial projection 50 adapted to be partly embedded in the compression plate 46 by virtue of elastic deformation thereof.

The second compression member is a spring 52 the arrangement of which on the locking body 24 will be described in more detail hereinafter.

The bolt 22 is provided with releasable snap-action means comprising an axial bearing bush 54 intended to cooperate with a first face (bearing face) 30 of the keeper and locking balls 56 mounted on the body 24 so that they are retractable and intended to cooperate with the second face (locking face) 32 of the keeper.

In the example described the bolt 22 has three locking balls 56 housed in angularly spaced radial channels 58 in the locking body 24, in a manner that is known in itself. The bolt 22 could include a smaller or a larger number of balls 56.

The compression spring 52 surrounds the locking body and is disposed between the second clamping plate 44 and a first end 54A of the bush designed to bear against the bearing face 30 of the keeper.

Figure 3:
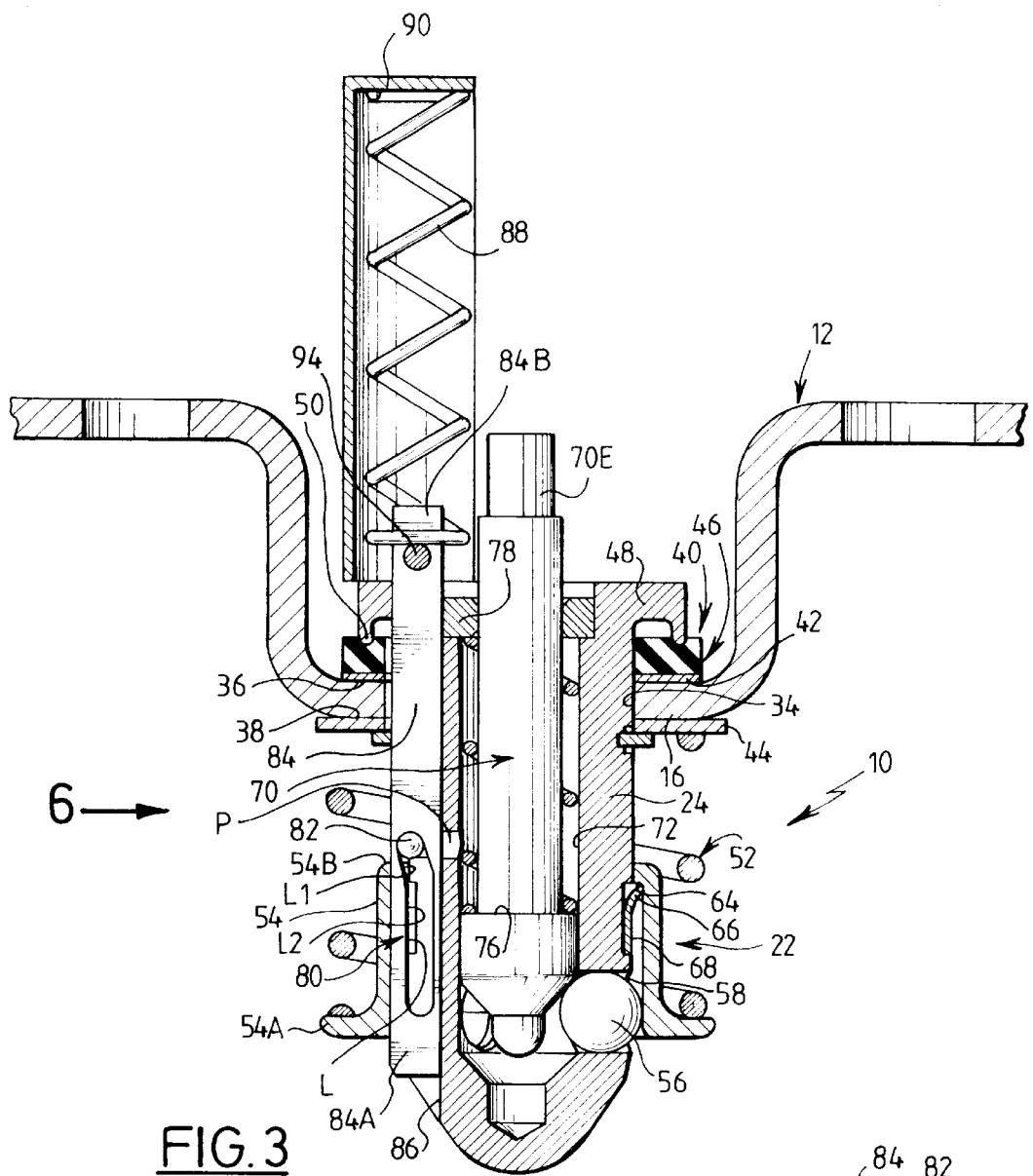
FIG. 3 is a view in axial section and to a larger scale of the catch shown in the previous figures, in which the bolt is separated from the keeper.

The bush 54 is moveable by virtue of cooperation with the keeper 28 against the spring return force of the spring 52 from a position in which the bolt 22 is released, as shown in FIGS. 1 and 3, to a position in which the bolt 22 is locked into the keeper 28, as shown in FIG. 5.

In the position in which it releases the bolt 22 the bush 54 covers the locking balls 56, holding them in the retracted position. In the position in which they lock the bolt 22 the bush 54 and the locking balls 56 grip the keeper 28.

The bolt 22 further comprises first and second means for limiting the travel of the bush 54 defining its bolt releasing and bolt locking positions, respectively.

The first means for limiting the travel of the bush 54 preferably comprise a second end 54B of the bush cooperating with a spring retaining ring (circlip) 60 disposed between the second end 54B and the second clamping plate 44.

The second means for limiting the travel of the bush 54 preferably comprise complementary axial abutments 64, 66 formed on facing surfaces of a protective ring 68 carried by the locking body 24 and of the bush 54. The protective ring 68 is of the type described in FR-A-2 735 174 (FR-95 06 868).

The bolt 22 also has means for displacing the locking balls 56 comprising a needle 70 mounted to slide in an axial bore 72 in the locking body 24. The bore 72 communicates with the radial passages 58.

The needle 70 for displacing the balls is of a conventional type, for example as described in FR-A-2 735 810 (FR-95 07 605).

Note that the needle 70 is spring-loaded towards a position holding the locking balls 56 in their projecting position, as shown in FIG. 5, by means of a compression spring 74 disposed between a shoulder 76 on the needle and an axial guide bearing 78 for the needle fixed to an open end of the axial bore 72.

The needle 70 extends partly through the bearing 78 outside the bore 72. The external end 70E of the needle is designed to be connected to conventional operating means that are not shown.

The bolt 22 further includes safety means 80 preventing accidental displacement of the bush 54 from its bolt releasing position to its bolt locking position otherwise than by cooperation of the bush 54 with the keeper 28.

The safety means 80 preferably comprise at least one safety ball 82 mounted on the locking body 24 to move between a position retracted inside the body 24 allowing the bearing bush 54 to slide along the body 24 (see FIG. 5) and a position projecting from the periphery of the body 24 immobilising the bearing bush 54 in the position covering the locking balls 56 (see FIG. 3).

The safety ball 82 is housed in a bore P which guides it between its projecting and retracted positions and in a drive slot L.

The guide bore P, which is preferably substantially radial, is formed in the locking body 24. The bore P does not necessarily open into the bore 70.

The drive slot L is formed in a mobile drive member 84 carried by the bolt 22.

The drive member 84, which is preferably in the form of a flat strip with a rectangular cross-section, is mounted to slide in a substantially axial guide groove 86 formed in the locking body 24.

The locking member 84 extends axially through the head 48 of the locking member, the elastic plate 46, the core 16 of the support, the clamping plates 42, 44 and the bearing bush 54. The various members through which the drive member 84 passes include a notch or a groove providing a passage for the member 84.

Note that the drive member 84 extends radially between the locking body 24 and the bearing bush 54.

The drive slot L has an oblique first part L1 cooperating in the manner of a ramp with the safety ball 82 to displace it between its projecting and retracted positions and an axial second part L2 for holding the safety ball 82 in the retracted position.

Figure 6:
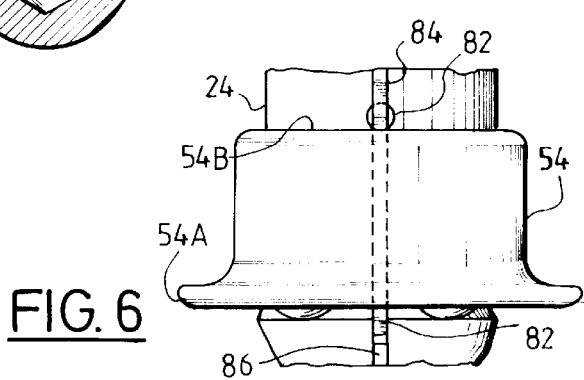
FIG. 6 is a detail view of the catch as seen in the direction of the arrow 6 in FIG. 3.

Note that the drive slot L is formed through the thickness of the drive member 84, the safety ball 82 having a diameter greater than this thickness (see FIG. 6). The safety ball 82 has a diameter greater than this thickness to enable contact of the second end 54B of the bush with the safety ball 82 when the ball is in its projecting position shown in FIGS. 3 and 6.

The drive member 84 has a first end (bearing end) 84A intended to cooperate with the keeper 28 (see FIGS. 4 and 5) and a second end 84B spring-loaded by a return spring 88 carried by the bolt 22.

Figure 2:
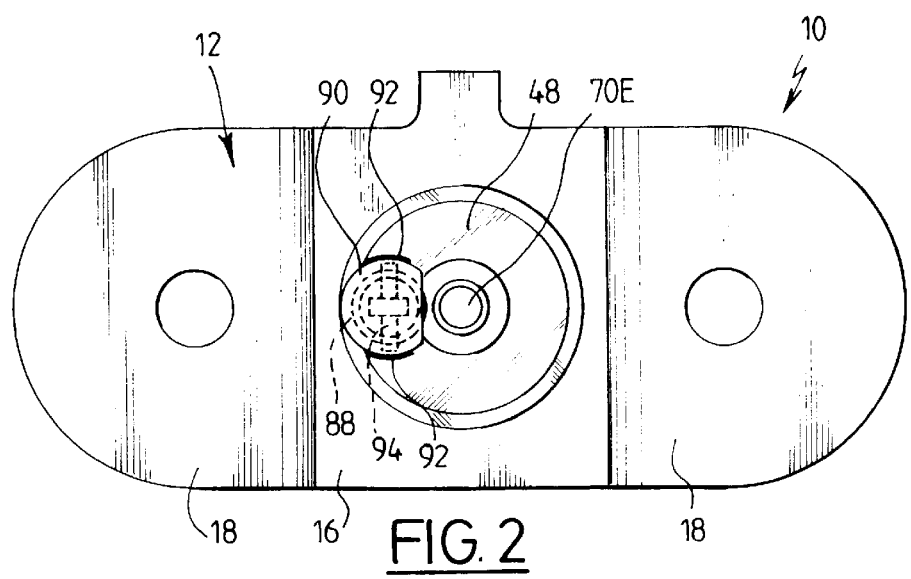
FIG. 2 is a plan view of the catch shown in FIG. 1.

The spring 88 is accommodated in a cylindrical casing 90 the axis of which is parallel to that of the needle 70, for example. The casing 90 has a first end fixed to the head 48 of the locking body, for example by welds 92, as shown in FIG. 2.

The return spring 88 is operative between a first seat formed by the second end of the casing 90 and a second seat formed by a transverse pin 94 carried by the second end 84B of the drive member.

The spring 88 spring loads the drive member 84 to return the safety ball 82 to its projecting position shown in FIG. 3.

Most operating features of the catch 10 are known in themselves and described for example in FR-A-2 735 174 (FR-95 06 868) and FR-A-2 735 810 (FR-95 07 605). Accordingly, only the operation of the safety means 80 is described hereinafter.

When the bolt 22 is unlocked (separated from the keeper 28), as shown in FIG. 3, the safety ball 82 is in the projecting position and cooperates with the second end 54B of the bearing bush to immobilise the bush in the position covering the locking balls 56.

Note that the bearing end 84A of the drive member projects axially relative to the bearing end 54A of the bush and is delimited by a bearing surface that is very small compared to that of the bearing end 54A of the bush.

The bearing end 84A of the drive member is small and this effectively prevents any accidental solicitation of the drive member 84 against the return spring 88. The stiffness of the spring 88 is preferably chosen to prevent movement of the drive member 84 against its return force by manual pressure on its bearing end 84A.

When the bolt 22 enters the locking orifice 26, because of the axial offsetting of the bearing ends of the drive 84 and of the bush 54, the keeper 28 cooperates with these two bearing ends 84A, 54A in succession.

Accordingly, the keeper 28 first displaces the drive member 84 which, through the intermediary of the oblique part L1 of the slot L, moves the safety ball 82 from its projecting position to its retracted position, as shown in FIG. 4. The bush 54 can then slide along the locking body 24. The keeper 28 then moves the bush 54 to its position locking the bolt 22, as shown in FIG. 5. The safety ball 82 is held in its retracted position by the axial part L2 of the slot L.

Conversely, when the bolt 22 is unlocked to separate it from the keeper 28, the spring 88 spring loads the drive member 84 which, by virtue of the ramp effect of the oblique part L1 of the slot L, returns the safety ball 82 to the projecting position immobilising the bush 54 in the position covering the locking balls 56.

One advantage of the invention is to prevent accidental displacement of the bearing bush against its return spring force when the bolt is separated from the keeper using simple means that are low in cost.

What is claimed is:

1. A catch comprising a bolt (22) having a generally cylindrical locking body (24) and means for clipping the body (24) into a keeper (28) by clamping the keeper between a bearing bush (54) and at least one retractable locking ball (56) carried by the locking body (24), the bearing bush (54) being mounted to slide axially around the locking body (24) and being moveable, by cooperation with the keeper (28), against a return spring force, from a position releasing the bolt (22), in which the bush (54) covers the locking ball (56), holding it in the retracted position, to a position locking the bolt (22), in which the bush (54) and the locking ball (56) grip the keeper (28), the bolt (22) further including safety means (80) preventing accidental displacement of the bush (54) from its bolt releasing position to its bolt locking position other than by cooperation of the bush (54) with the keeper (28);

wherein the safety means (80) comprise at least one safety ball (82) mounted on the locking body (24) so as to be moveable between a position retracted into the body (24) allowing the bearing bush (54) to slide along the body (24) and a position projecting from the periphery of the body (24) immobilizing the bearing bush (54) in the position covering the locking ball (56).

2. The catch according to claim 1, wherein the safety bore (82) is housed in a bore (P) which guides it between its projecting and retracted positions and in a drive slot (L), the guide bore (P) being formed in the locking body (24) and the drive slot (L) being formed in a mobile drive member (84) carried by the bolt (22).

3. The catch according to claim 2, wherein the drive member (84) is mounted on the locking body (24) so that it can slide substantially axially, the drive slot (L) having an oblique first part (L1) cooperating with a ramp effect with the safety ball (82) to move it between its projecting and retracted positions and an axial second part (L2) for holding the safety ball (82) in its retracted position.

4. The catch according to claim 3, wherein the drive member (84) is mounted in a substantially axial guide groove (86) formed in the guide body (24) to slide in it and extends radially between the body (24) in succession and the bearing bush (54).

5. The catch according to claim 2, wherein the drive member (84) is spring-loaded to return the safety ball (82) to the projecting position.

6. The catch according to claim 2, wherein the drive member (84) is a flat strip, the drive slot (L) being formed through the thickness of the drive member (84), the safety ball (82) having a diameter greater then this thickness so as to enable contact of the safety ball (82) with the bearing bush (54) when the safety ball (82) is in its projecting position.

7. The catch according to claim 2, wherein the bush (54) and the drive member (82) each have a bearing end (54A, 84A) intended to cooperate with the keeper (28), the bearing end (84A) of the drive member projecting relative to the bearing end (54A) of the bush when the bush (54) is in its position covering the locking ball (56) so as to allow, by cooperation of the keeper (28) with these two bearing ends (54A, 84A) in succession, firstly, displacement of the drive member (84) to move the safety ball (82) from its projecting position to its retracted position and then displacement of the bush (54) to its position locking the bolt (22) in the keeper (28).

8. A catch according to claim 2, wherein the both (22) is connected to an automobile vehicle seat and the keeper (28) is attached to a floor (14) of the vehicle.

9. A catch comprising a bolt (22) having a generally cylindrical locking body (24) and means for clipping the body (24) into a keeper (28) by clamping the keeper between a bearing bush (54) and at least one retractable primary locking member (56) carried by the locking body (24), the bearing bush (54) being mounted to slide axially around the locking body (24) and being movable, by cooperation with the keeper (28), against a return spring force, from a position in which the bolt (22) is released and in which the bush (54) covers the primary locking member (56) and holds it in the retracted position, to a position in which the bolt (22) is locked and in which the bush (54) and the primary locking member (56) grip the keeper (28), the bolt (22) further including a secondary locking member (82) actuable by a drive member (84) which is substantially axially slidably mounted on the locking body (24) between an operative position, in which said secondary locking member (82) immobilizes the bearing bush (54) in the position covering the primary locking member (56), and a stand-by position in which said secondary locking member allows the bearing bush (54) to slide along the body (24).

10. The catch according to claim 9, wherein the bush (54) and the drive member (84) each have a respective bearing end (54A, 54B) adapted to cooperate with the keeper (28), the bearing end (84A) of the drive member projecting relative to the bearing end (54A) of the bush when the bush (54) is in its position covering the locking organ (56).

11. The catch according to claim 9, wherein the secondary locking member comprises a safety member (82), the standby position of which is a position retracted into the locking body (24), and the operating position of which is a position projecting from the periphery of the body (24).

12. The catch according to claim 11, wherein the safety member (82) is a safety ball housed in a bore (P) formed in said locking body (24) which guides it between its projecting and retracted positions and in a drive slot (L) formed in said drive member (84).

13. The catch according to claim 12, wherein the drive slot (L) has an oblique first part (L1) cooperating with a ramp effect with the safety ball (82) to move it between its projecting and retracted positions and an axial second part (L2) for holding the safety ball (82) in its retracted position.

14. The catch according to claim 13, wherein the drive member (84) is slidably mounted in a substantially axial guide groove (86) formed in the guide body (24) and extends radially between the body (24) and the bearing bush (54).

15. The catch according claim 12, wherein the drive member (84) is spring-loaded to return the safety ball (82) to the projecting position.

16. The catch according to claim 12, wherein the drive member (84) is a flat strip, the drive slot (L) being formed through the thickness of the drive member (84), the safety ball (82) having a diameter greater than this thickness so as to enable contact of the safety ball (82) with the bearing bush (54) when the safety ball (82) is in its projecting position.

17. A catch according to claim 9, wherein the bolt (22) is connected to an automobile vehicle seat and the keeper (28) is attached to a floor (14) of the vehicle.

\* \* \* \* \*